United States Patent [19]

Peters

[11] 4,364,412
[45] * Dec. 21, 1982

[54] PULL TYPE RELAY VALVE WITH AUTOMATIC LOCKOUT

[75] Inventor: Clifford M. Peters, Longview, Tex.

[73] Assignee: W-K-M Wellhead Systems, Inc., Shreveport, La.

[*] Notice: The portion of the term of this patent subsequent to Dec. 16, 1997, has been disclaimed.

[21] Appl. No.: 205,846

[22] Filed: Nov. 10, 1980

[51] Int. Cl.³ .............................................. F15B 13/042
[52] U.S. Cl. .................................... 137/557; 137/458; 137/625.66
[58] Field of Search .................... 137/458, 625.66, 557

[56] References Cited

U.S. PATENT DOCUMENTS 4,121,615 10/1978 Bergeron .................... 137/625.66 X
4,239,058 12/1980 Peters ......................... 137/625.66 X Primary Examiner—Gerald A. Michalsky
Attorney, Agent, or Firm—Stephen T. Belsheim; Marvin J. Marnock

[57] ABSTRACT

A manually set relay valve (38) for controlling fluid flow to and from a valve actuator (14). A slide valve (60) is manually pulled outwardly to the set or open position and held therein by pilot pressure applied to a piston chamber (46) through a passage (110) in the slide valve (60). When the slide valve (60) is tripped to the closed position due to an interruption of pilot pressure, a cross port (112) of the fluid passage (110) vents the piston chamber (46) to maintain the relay (38) closed until manually reset.

7 Claims, 5 Drawing Figures

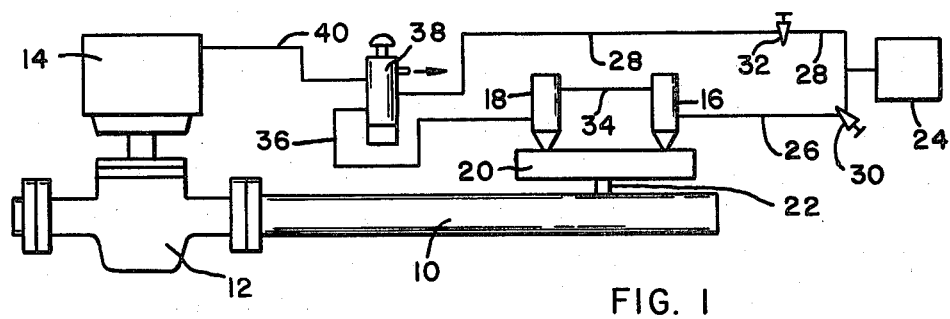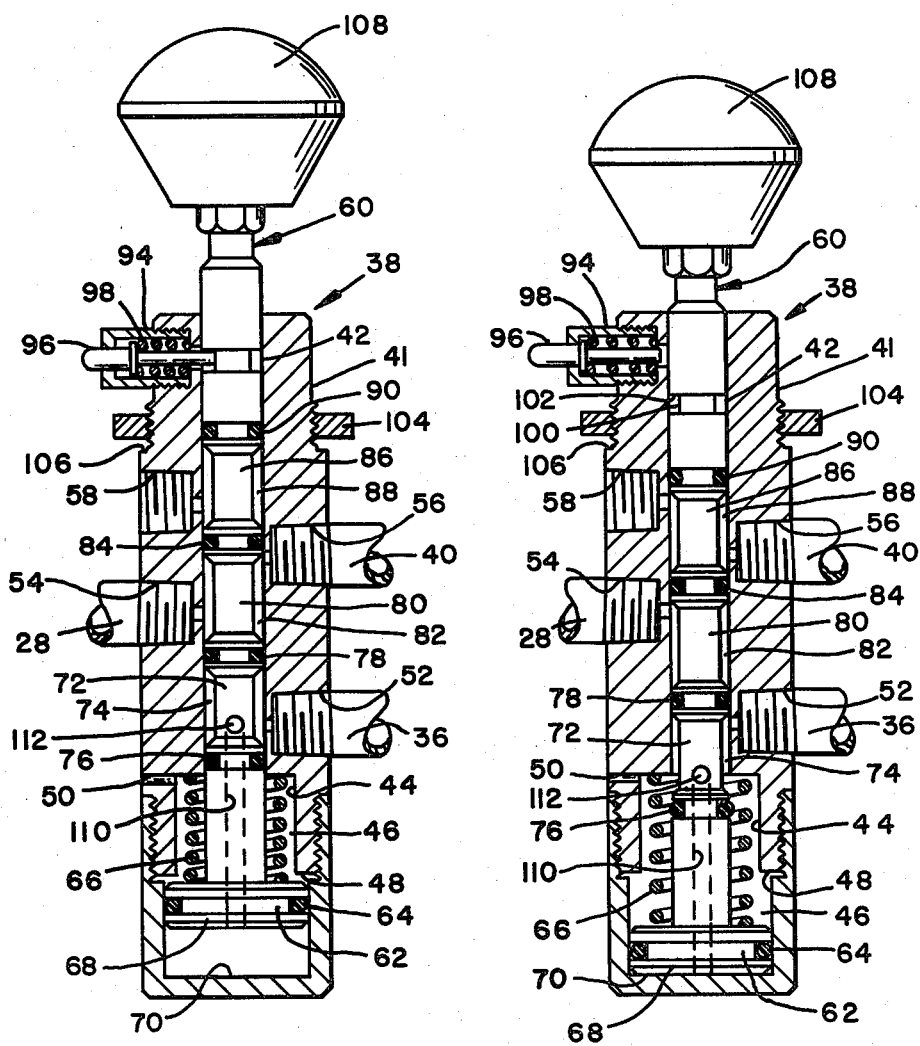

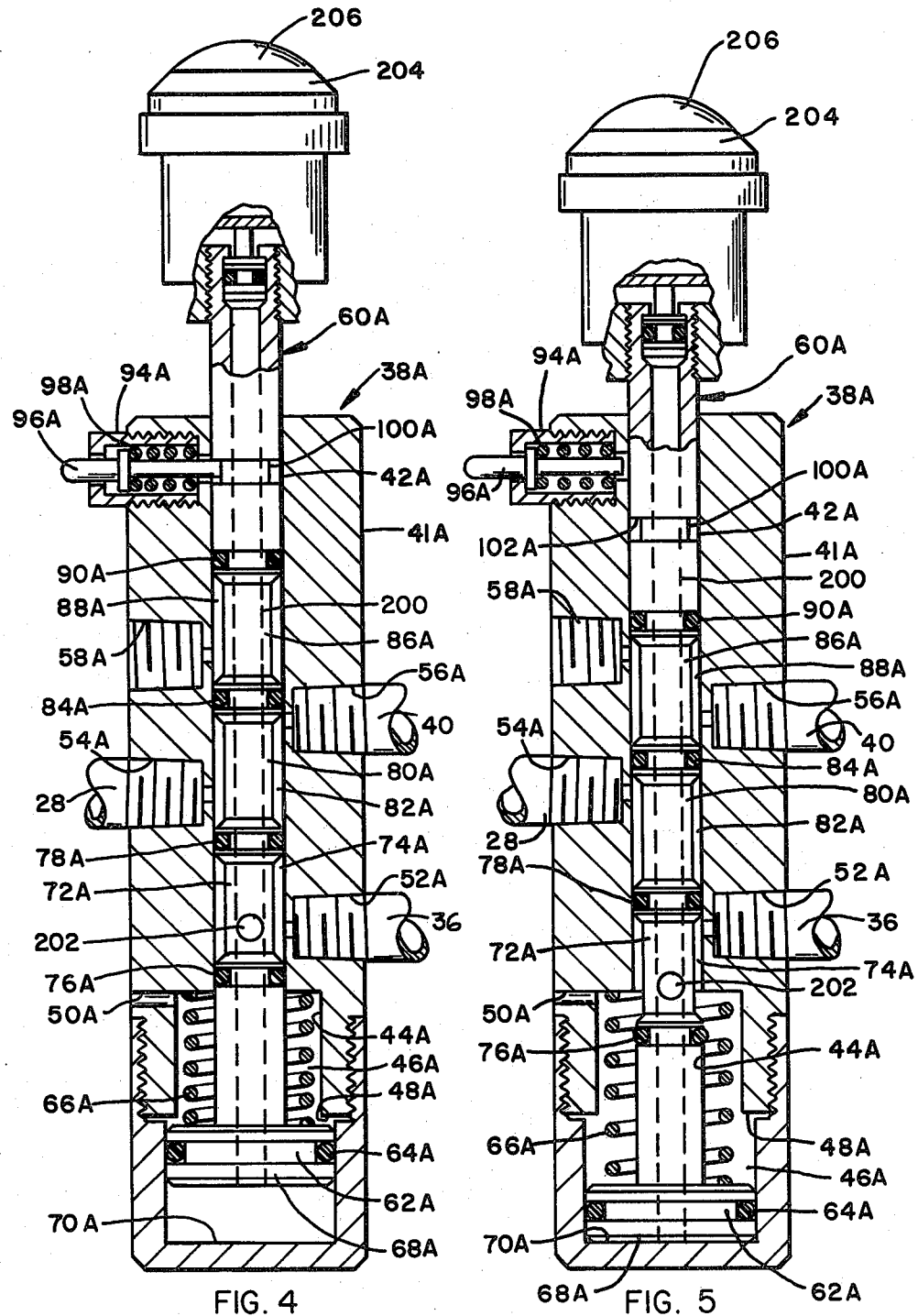

PULL TYPE RELAY VALVE WITH AUTOMATIC LOCKOUT

BACKGROUND OF THE INVENTION

This invention relates to manually set relay valves of the type used in fluid control systems such as safety systems for oil and gas wells.

Safety systems of this type act to shut-in well production lines and other flowlines in the event of unusually high or low pressure conditions. A pilot operated relay valve is typically included in the safety systems to control fluid flow to and from the fluid actuator of a gate valve which opens and closes the flowline. In normal operation, the relay is held open by fluid pressure applied by pilots which sense the flowline pressure. When the pressure in the flowline is outside of the operating range of the safety system, the pilot pressure to the relay is interrupted and the relay closes. Fluid is then bled from the actuator to effect closing of the gate valve. The relay must be manually reset to the open position after the problem which caused the abnormal pressure has been corrected.

In order to assure that a resumption of pilot pressure will not reset the relay, various types of valve constructions have been proposed to achieve automatic lockout of the slide valve which forms the valve element of the relay. Manual resetting is thus necessary before the flowline can be opened following closing of the gate valve, and the problem can be identified and corrected without the possibility of it going undetected. The automatic lockout arrangements which have been proposed by others than applicant herein in the past, such as those shown in U.S. Pat. Nos. 3,877,484, 4,094,340 and 4,145,025, are less than satisfactory in a number of respects, most notably in their complexity and lack of reliability. Difficulties in proper functioning of such devices can arise in the event of seal leakage, which is not at all uncommon with O-rings and similar seal elements, particularly after the valve has been used extensively.

The relays which have been used in the past have usually been pull type valves in which a knob on the slide valve is pulled outwardly for resetting, although push type valves have also been proposed. Existing pull type relays have a pilot port in the inner end of the valve body which creates problems with respect to automatic lockout due to the application of pilot pressure directly against the piston of the slide valve, thereby tending to unseat the slide valve when pilot pressure resumes after having been interrupted. Relays have also been provided with visual indicators which display their condition, as disclosed in U.S. Pat. Nos. 4,121,615 and 4,137,942.

Applicant herein has proposed a pull type relay valve with an automatic lockout that is the subject of co-pending U.S. patent application Ser. No. 57,911 filed July 16, 1979, now U.S. Pat. No. 4,239,058. Applicant's structure presented herein differs from that shown in patent application Ser. No. 57,911 in the specific structure of the slide valve and the porting arrangement in the body. The present structure of the slide valve includes a trio of reduced diameter portions separated and bounded by O-rings carried by the slide valve instead of either a single reduced diameter slide valve portion bounded by solid portions or a pair of reduced diameter slide valve portions separated by a solid portion and O-rings and bounded by O-rings as shown in the application Ser. No. 57,911. The present structure also includes a body having the bleed port as the axially outermost port as opposed to the supply port being axially outermost as shown in patent application Ser. No. 57,911.

SUMMARY OF THE INVENTION

In accordance with the present invention, a pilot operated relay includes a slide valve having a knob on its outer end which may be pulled to set the slide valve in the open position wherein a first pressurized fluid is directed to a fluid controlled device. A second fluid pressure acts against a piston of the slide valve to hold it open, and a spring is provided to close the slide valve in the event of interruption of the second fluid pressure. A fluid pressure formed in the slide valve has a cross port which communicates with the second fluid port in the open position of the slide valve to direct the second fluid into the passage and to the inner end of the piston for holding the slide valve open. When the slide valve is in the closed position, the cross port is in direct fluid communication with a vent port to assure that a resumption of second fluid pressure cannot shift the slide valve to the open position.

BRIEF DESCRIPTION OF THE DRAWINGS

FIG. 1 is a diagrammatic view showing a fluid controlled safety system which includes a pilot operated relay valve constructed in accordance with the present invention;

FIG. 2 is a sectional view of a relay valve without visual indicator constructed according to the present invention, with the valve in its open or unseated position;

FIG. 3 is a sectional view similar to FIG. 2, but showing the relay valve in its closed or seated position;

FIG. 4 is a sectional view of a relay valve with visual indicator constructed according to the present invention, with the valve in its open or unseated position; and FIG. 5 is a sectional view similar to FIG. 4 but showing the valve in its closed or seated position.

DETAILED DESCRIPTION OF SPECIFIC EMBODIMENTS

Referring initially to FIG. 1, a fluid operated safety system is used to control the fluid flow through a main flowline 10 which is typically the production line of an oil or gas well. Line 10 is equipped with a surface safety valve in the form of a conventional gate valve 12 which may be opened and closed to open and close line 10. A hydraulic or pneumatic actuator 14 is mounted to valve 12 and acts to maintain valve 12 in the open position when pressurized fluid is applied to the actuator. When fluid is bled from actuator 14, a spring or the like (not shown) moves valve 12 to the closed position to shut-in the flowline 10.

The pressure in line 10 is sensed by pressure sensitive pilots in the form of a high pressure pilot 16 and a low pressure pilot 18. Pilots 16 and 18 are arranged in series with one another and are mounted on a manifold 20 which applies the flowline pressure to the pilots. A short circuit 22 connects manifold 20 with line 10. A fluid source 24, which is typically a pressurized cylinder of gas or hydraulic fluid, applies pressurized fluid to a pair of lines 26 and 28 which may be maintained at different pressures by respective pressure regulators 30 and 32. Line 26 leads to the inlet of high pilot 16, while another line 34 extends from the outlet of pilot 16 to the inlet of low pressure pilot 18. Line 36 serves as a pilot line which extends from the outlet of low pilot 18 to a pilot port of a relay valve 38 constructed in accordance with the present invention. Line 28 leads to the inlet or supply port of relay 38 and communicates with an outlet line 40 when relay valve 38 is open, as will be more fully explained. Line 40 leads to actuator 14 in order to apply pressurized fluid thereto for holding of gate valve 12 in the open position.

High pilot 16 is set to trip to its closed position if the pressure in line 10 exceeds a predetermined high pressure level corresponding to the setting of the high pilot. Conversely, low pilot 18 is set to trip to its closed position when the pressure in line 10 is below a predetermined low pressure level corresponding to the setting of the low pilot. An operating pressure range of the safety system is thus defined between the low pressure setting of pilot 18 and the high pressure setting of pilot 16. When the flowline pressure is within the operating range of the system, pilot fluid from source 24 is directed through pilots 16 and 18 to line 36 where it acts to maintain relay 38 in its open position. Consequently, actuator fluid from source 24 passes through line 28, relay 38, and line 40 to actuator 14 in order to maintain valve 12 in the open position. If the pressure in line 10 drops below the setting of pilot 18 or rises above the setting of pilot 16, the pilot flow from line 26 to line 36 is interrupted and relay 38 closes to bleed fluid from actuator 14. In this manner, valve 12 is closed to shut-in the flowline when the pressure is outside of the operating range of the safety system.

Referring now to the details of relay valve 38, FIGS. 2 and 3 show the embodiment of the relay valve without visual indicator in its respective open and closed positions. Relay 38 includes a cylindrical valve body 41 having a cylindrical longitudinal bore 42. Bore 42 extends into body 41 from the outer end thereof and has a first enlarged portion 44 near the inner end of the valve body. Immediately inwardly of portion 44 is another enlarged bore portion which defines a cylindrical piston chamber 46 near the inner end of valve body 41. An annular shoulder 48 is presented at the intersection of bore portion 44 with piston chamber 46. A vent 50 is formed in the side of valve body 41 and connects with enlarged bore portion 44.

At a location outwardly of bore portion 44, the side of valve body 41 is provided with a pilot port 52 which connects with pilot line 36. A supply port 54 is formed in the side of body 41 at a location outwardly of pilot port 52. An outlet or actuator port 56 is formed in the side of body 41 at a location outwardly of supply port 54. Actuator port 56 is connected with actuator line 40. A bleed port 58 is formed in the side of body 41 at a location downwardly of actuator port 56. A supply port 54 connects with line 28. Each port 52–58 is reduced in size at its inner end and connects with bore 42.

An elongate slide valve 60 is received in bore 42 for longitudinal sliding movement therein. Slide valve 60 forms the valve element of relay 38 and carries an enlarged piston 62 on its inner end. Piston 62 is located in piston chamber 46 and is sealed to the wall thereof by an O-ring 64 carried in an annular groove formed on the periphery of the piston. A compression spring 66 is located in bore portion 44 and acts against piston 62 in a manner to continuously urge slide valve 60 inwardly toward the closed or seated position thereof shown in FIG. 3. Piston 62 has a flat pressure face 68 which faces inwardly and which seats against a flat internal surface 70 of body 41 when the slide valve is in the closed position. When slide valve 60 is in the unseated or open position thereof, piston 62 contacts shoulder 48 to limit the outward movement of slide valve 60.

Slide valve 60 is reduced in diameter to provide a first reduced diameter portion 72 located outwardly of piston 62. A first annular chamber 74 is defined between reduced diameter portion 72 and longitudinal bore 42. A pair of O-rings 76 and 78 are carried in annular grooves formed in slide valve 60 at locations on opposite sides of reduced diameter portion 72 for sealing between slide valve 60 and longitudinal bore 42. A second reduced diameter portion 80 is formed on slide valve 60 at a location outwardly of first reduced diameter portion 72. A second annular chamber 82 is defined between longitudinal bore 42 and second reduced diameter portion 80. O-rings 78 and 84 are carried in annular grooves formed in slide valve 60 at locations on opposite sides of reduced diameter portion 80 for sealing between slide valve 60 and longitudinal bore 42. A third reduced diameter portion 86 is formed on slide valve 60 at a location axially outwardly of second reduced diameter portion 80. A third annular chamber 88 is defined between third reduced diameter portion 86 and longitudinal bore 42. O-rings 84 and 90 are carried in annular grooves formed in slide valve 60 at locations on opposite sides of third reduced diameter portion 86 for sealing between slide valve 60 and longitudinal bore 42.

Slide valve 60 may be temporarily latched in the open position by a detent mechanism which includes a hollow sleeve fitting 94 threaded into the side of valve body 41 near the outer end thereof. A plunger 96 is slidably received in sleeve fitting 94. Plunger 96 is urged outwardly by a compression spring 98. Plunger 96 has an outer end which projects out of fitting 94 and an inner end which is small enough to enter an annular groove 100 formed in slide valve 60. A shoulder 102 of groove 100 contacts the inner end of plunger 96 and, in cooperation with spring 66, provides frictional contact which holds slide valve 60 in the open position shown in FIG. 2 during buildup of pressure in piston chamber 46. When the fluid pressure has built up sufficiently in the piston chamber to overcome the force of spring 66, plunger 96 is released from its frictional contact with shoulder 102 and is pushed outwardly by spring 98 to the position shown in FIG. 3.

A fluid passageway 110 extends longitudinally through slide valve 60 from a position within first reduced diameter portion 72 to pressure face 68 of piston 62. A cross port 112 provides an inlet for delivering fluid to fluid passageway 110 and is in fluid communication with annular chamber 74.

A handle or knob 108 is mounted on the outer end of slide valve 60 at a location outwardly of valve body 41.

In order to mount relay valve 38 to a panel or the like (not shown), a nut 104 is threaded onto valve body 41. The panel to which the relay is mounted is located between nut 104 and a flat shoulder 106 formed on valve body 41.

FIGS. 4 and 5 illustrate a second embodiment of the invention which is directed to a relay valve generally designated by reference numeral 38A. Relay valve 38A is similar to relay valve 38 in most respects, and the elements which are similar in the two embodiments are identified by the same reference numeral with the letter "A" following each of the numerals used in FIGS. 5 and 6. The respects in which the second embodiment differs from the first embodiment will now be described.

Referring now to FIGS. 4 and 5, a fluid passage 200 extends longitudinally through slide valve 60A. Fluid passage 200 leads to pressure face 68A of piston 62A and is provided with a cross port 202 at a location intermediate the length of the passage. Cross port 202 serves as an inlet port for delivering fluid to passage 200 and is located in reduced diameter portion 72A between O-rings 76A and 78A in communication with annular chamber 74A.

A handle or knob 204 is mounted on the outer end of slide valve 60A at a location outwardly of valve body 41A. Knob 204 is provided with a visual indicator device identical to that disclosed in U.S. Pat. No. 4,137,942 to Hargraves et al which is incorporated herein by reference as to the details of the visual indicator. As explained in the aforementioned patent, knob 204 has a lens 206 through which a color such as green is visible to indicate the open position of slide valve 60A. A contrasting color such as red is visible through lens 206 to indicate the closed position of slide valve 60A. The green color is displayed when passage 200 is exposed to fluid pressure above a predetermined level, while a spring (not shown) of the indicator mechanism effects the red condition of the indicator when the fluid pressure in passage 200 is below a level sufficient to overcome the spring force.

The operation of the two embodiments is similar in most respects so that one description of the operation of both embodiments is all that is necessary. Any differences between the two embodiments will be set forth. The safety system shown in FIG. 1 is placed in service by setting relay valve 38 or 38A in the open position. This is accomplished by pulling outwardly on knob 108 or 206 to pull slide valve 60 or 60A outwardly to the position shown in FIG. 2 (first embodiment) or FIG. 4 (second embodiment). Plunger 96 or 96A is then pressed inwardly to temporarily maintain the slide valve in the open position while the pressure builds up downstream of gate valve 12. With relay 38 or 38A set in the open position, the fluid in line 28 is able to flow into annular chamber 82 or 82A through supply port 54 or 54A and from chamber 82 or 82A to line 40 through actuator port 56 or 56A. Pressurized fluid is thus supplied to actuator 14 in order to open gate valve 12. O-rings 84 and 84A and 78 and 78A confine the fluid to chamber 82 or 82A and thus seal bleed port 58 or 58A from the actuator fluid.

Once gate valve 12 has opened, the pressure in line 10 builds up and eventually rises above the setting of low pilot 18 so that both pilots 16 and 18 are open to apply pilot fluid to line 36 and pilot port 52 or 52A of relay valve 38 or 38A. With respect to the first embodiment, pilot fluid is delivered to annular chamber 74 and enters fluid passage 110 through cross port 112. Fluid passage 110 directs fluid into piston chamber 46. Once the fluid pressure in piston chamber 46 has built up sufficiently, the pressure shifts slide valve 60 outwardly far enough to release the frictional engagement of plunger 96 with shoulder 102. Spring 98 then pushes plunger 96 outwardly to automatically release the detent mechanism. The fluid pressure in piston chamber 46 thereafter acts against pressure face 68 of piston 62 to maintain slide valve 60 in the open position. O-rings 76 and 78 seal between the slide valve and the bore so that the incoming pilot fluid is confined to chamber 74, cross port 112, passage 110 and piston chamber 46. With respect to the second embodiment, pilot fluid is delivered to annular chamber 74A and enters fluid passage 200 through cross port 202. Passage 200 directs the fluid into piston chamber 46A and also to the visual indicator device in knob 204 in order to display the green condition of the indicator. Once the fluid pressure in piston chamber 46A has built up sufficiently, the pressure shifts slide valve 60A outwardly far enough to release the frictional engagement of plunger 96A with shoulder 102A. Spring 98A then pushes plunger 96A outwardly to automatically release the detent mechanism. The fluid pressure in piston chamber 46A thereafter acts against pressure face 68A of piston 62A to maintain slide valve 60A in the open position. Due to the seals provided in bore 42A by O-rings 76A and 78A, the incoming pilot pressure is confined to chamber 74A, cross port 202, fluid passage 200, piston chamber 46A, and the visual indicator located in knob 204.

Relay valve 38 or 38A remains in the open position to maintain valve 12 open so long as the pressure in flowline 10 is within the operating range of the safety system as determined by the settings of pilots 16 and 18. However, if the pressure in line 10 rises above the setting of high pilot 16 or drops below the setting of low pilot 18, the appropriate pilot 16 or 18 closes to interrupt fluid flow to line 36 and bleed fluid from line 36. The resulting pressure drop at pilot part 52 or 52A permits spring 66 or 66A to push slide valve 60 or 60A inwardly to the closed position of FIG. 3 or FIG. 5. In this position, O-ring 84 or 84A provides a seal between supply port 54 or 54A and actuator port 56 or 56A, while bleed port 58 or 58A and actuator port 56 or 56A communicate through chamber 88 or 88A in order to bleed fluid from actuator 14 and thereby effect closing of the gate valve 12.

If the pressure at pilot port 52 or 52A should resume for any reason, the pilot pressure is directly vented to vent 50 or 50A through chamber 74 or 74A and bore portion 44 or 44A, and the pressure cannot reach piston chamber 46 or 46A. Consequently, relay valve 38 or 38A is automatically locked in the closed position and can be reset to the open position only by manually pulling slide valve 60 or 60A outwardly. In the closed position of the slide valve, cross port 112 or 202 is located in enlarged bore portion 44 or 44A in direct fluid communication with vent 50 or 50A. Therefore, any fluid in piston chamber 46 or 46A inwardly of pressure face 68 or 68A is vented, and an additional safety feature is thus provided to assure that valve 38 or 38A is locked in the closed position even if there is leakage past one or more seal elements. With respect to the second embodiment, since the pressure in fluid passage 202 is exhausted in the closed position of the slide valve, the visual indicator mechanism in knob 204 displays the red color through lens 206 to indicate an abnormal condition of the safety system.

What is claimed is:

1. A valve for controlling the flow of a first fluid to a fluid controlled device in response to pressure changes in a second fluid, said valve comprises:
an elongate valve body presenting a longitudinal bore therein, said bore having an enlarged diameter inner end portion defining a piston chamber in said valve body and a reduced diameter ore portion joined with said piston chamber by an annular shoulder;
a second fluid port in a side portion of said valve body adjacent said piston chamber for sensing the pressure of said second fluid, said second fluid port directly communicating with said reduced diameter bore portion;

a supply port in said valve body axially outward of said second fluid port for directing the incoming first fluid to said bore;

an outlet port in said valve body axially outward of said supply port for receiving the first fluid from said bore for application to the fluid controlled device;

a bleed port in said valve body axially outward of said outlet port for exhausting the first fluid from said bore;

a slide valve mounted in said bore for longitudinal movement between an open position for directing the first fluid to the fluid controlled device and a closed position for bleeding the first fluid from the fluid controlled device, said side valve having an outer end extending outwardly of said valve body having a knob thereon for manually pulling said slide valve outwardly from the closed position to the open position for manual setting of said slide valve;

said slide valve having a trio of reduced diameter positions, an inner reduced diameter valve portion providing an inner annular space in continuous communication with said second fluid port, a mediate reduced diameter valve portion positioned axially outward of said inner reduced diameter valve portion providing a mediate annular space in fluid communication with said supply port and said outlet port in the open position of said slide valve, and an outer reduced diameter valve portion positioned axially outward of said mediate reduced diameter valve portion providing an outer annular space in fluid communication with said bleed port and said outlet port in the closed position of said slide valve;

biasing means, contained within said piston chamber, for biasing said slide valve inward towards the closed position;

a piston carried in said piston chamber on an inner end portion of said slide valve, said piston presenting an inwardly facing pressure face for receiving the second fluid to hold said slide valve in the open position against the force of said biasing means; and a fluid passage in said slide valve for directing the second fluid to said piston chamber for application to said pressure face, said passage extending to said pressure face and having an inlet port formed in a side portion of said slide valve at a location in fluid communication with said second fluid port when said slide valve is in the open position, whereby the second fluid pressure is applied from said second fluid port through said inlet port and said fluid passage to said piston chamber and against said pressure face of said piston to hold said slide valve in the open position when the second fluid pressure is sufficient to overcome the force of said biasing means.

2. A valve as set forth in claim 1 further including:

a vent port formed in said valve body adjacent said annular shoulder and being in fluid communication with said bore on a side of said piston opposite said pressure face; and sealing means for sealing said inlet port from said vent port in the open position of said slide valve.

3. A valve as set forth in claim 2, wherein said inlet port and vent port are in fluid communication with one another in the closed position of said slide valve thereby preventing buildup of second fluid pressure in said piston chamber adjacent said pressure face in the closed position of said slide valve.

4. A valve as set forth in claim 1 wherein said inlet port is located in said inner reduced diameter valve portion; and a pair of seal elements forms spaced apart seals in said bore between said valve body and said slide valve when said slide valve is in the open position, said seals being located at opposite end of said inner annular space to provide a closed fluid path through said inner annular space between said second fluid port and said inlet port in the open position of the slide valve.

5. A valve as set forth in claim 1 further including:

visual indicator means, on said outer end of said slide valve, for moving between a first condition indicating the open position of said slide valve and a second condition indicating the closed position of the slide valve;

means for effecting the first condition of said visual indicator means when said fluid passage is exposed to the second fluid at a pressure above a predetermined level; and means for effecting the second condition of said visual indicator means when the second fluid in said fluid passage is below said predetermined level.

6. A valve as set forth in claim 5 further including:

a releasable detent means for temporarily holding said slide valve in the open position when manually set therein.

7. A valve as set forth in claim 1 further including:

a releasable detent means for temporarily holding said slide valve in the open position when manually set therein.

* * * * *